(12) United States Patent
Ogata et al.

(10) Patent No.: US 11,364,580 B2
(45) Date of Patent: Jun. 21, 2022

(54) FASTENING DEVICE

(71) Applicant: TOHNICHI MFG. CO., LTD., Tokyo (JP)

(72) Inventors: Tomohiro Ogata, Tokyo (JP); Kyoichi Komatsu, Tokyo (JP); Seiji Ito, Tokyo (JP)

(73) Assignee: TOHNICHI MFG. CO., LTD., Tokyo (JP)

( * ) Notice: Subject to any disclaimer, the term of this patent is extended or adjusted under 35 U.S.C. 154(b) by 19 days.

(21) Appl. No.: 17/048,807

(22) PCT Filed: May 15, 2019

(86) PCT No.: PCT/JP2019/019250
§ 371 (c)(1),
(2) Date: Oct. 19, 2020

(87) PCT Pub. No.: WO2020/121550
PCT Pub. Date: Jun. 18, 2020

(65) Prior Publication Data
US 2021/0213575 A1    Jul. 15, 2021

(30) Foreign Application Priority Data
Dec. 11, 2018  (JP) .............................. JP2018-231252

(51) Int. Cl.
*B23P 19/06* (2006.01)
*F16B 23/00* (2006.01)
*F16B 31/04* (2006.01)

(52) U.S. Cl.
CPC ........... *B23P 19/066* (2013.01); *B23P 19/067* (2013.01); *F16B 23/0038* (2013.01); *F16B 31/04* (2013.01)

(58) Field of Classification Search
CPC ....... B23P 19/066; B23P 19/067; B23P 19/06; B23P 19/006; B23P 19/065; B23P 19/00;
(Continued)

(56) References Cited

U.S. PATENT DOCUMENTS

| 4,462,283 A * | 7/1984 | Ito ......................... B23P 19/006 81/454 |
| 6,105,475 A * | 8/2000 | Ohmi .................... B23P 19/066 81/429 |

(Continued)

FOREIGN PATENT DOCUMENTS

| CN | 101512313 B | 2/2013 |
| DE | 2328444 A1 | 1/1975 |

(Continued)

OTHER PUBLICATIONS

English translation of DE202006001195 (Year: 2006).*
(Continued)

*Primary Examiner* — Jun S Yoo
(74) *Attorney, Agent, or Firm* — Manabu Kanesaka (57) ABSTRACT

In a fastening device for fastening a bolt, a male thread is formed on a side surface of a bolt head part, and a part to be engaged is formed on a top surface of the bolt head part. The fastening device includes a bit having a tension rod having a rod female thread part, and an engaging part installed inside the tension rod and engaging the engaged part, the bit causing the bolt to rotate where the engaged part and engaging part are engaged; a supporter surrounding the tension rod in the circumferential direction such that the lower end part thereof protrudes below the lower end part; a sensor for sensing vertical compression force acting on the supporter; a first motor for causing the bit to rotate about the axis; and a second motor for causing the tension rod to rotate about the vertically extending axis.

5 Claims, 7 Drawing Sheets

(58) Field of Classification Search
CPC .. F16B 23/0038; F16B 31/04; F16B 23/0084; F16B 35/06; B25B 29/02; B25B 23/12; B25B 21/002; B25B 23/147; B25B 21/00; B25B 15/008; B25B 23/00
See application file for complete search history.

(56) References Cited

U.S. PATENT DOCUMENTS

| | | | |
|---|---|---|---|
| 6,144,891 A * | 11/2000 | Murakami | B23P 19/066 700/108 |
| 6,203,311 B1 | 3/2001 | Dray | |
| 6,421,902 B1 * | 7/2002 | Loffler | F16B 31/043 29/407.02 |
| 6,464,488 B2 | 10/2002 | Dray | |
| 8,261,421 B2 | 9/2012 | Monville | |
| 2002/0005219 A1 | 1/2002 | Dray | |
| 2010/0005663 A1* | 1/2010 | Monville | B25B 29/02 29/898.09 |
| 2020/0171636 A1 | 6/2020 | Tsuji et al. | |

FOREIGN PATENT DOCUMENTS

| | | | | |
|---|---|---|---|---|
| DE | 19960040 | A1 | 6/2001 | |
| DE | 202006001195 | U1 * | 3/2006 | B25B 23/0035 |
| DE | 202006001195 | U1 | 3/2006 | |
| EP | 2871027 | A1 | 5/2015 | |
| JP | S54-6317 | B2 | 3/1979 | |
| JP | S63-102879 | A | 5/1988 | |
| JP | H10-170362 | A | 6/1998 | |
| JP | 2003-240655 | A | 8/2003 | |
| JP | 2004-101246 | A | 4/2004 | |
| JP | 4363661 | B2 | 11/2009 | |
| JP | 2011-125936 | A | 6/2011 | |
| JP | 6381840 | B1 | 8/2018 | |
| WO | 99/57466 | A1 | 11/1999 | |

OTHER PUBLICATIONS

PCT/IB/338, "Notification of Transmittal of Translation of the International Preliminary Report on Patentability for International Application No. PCT/JP2019/019250," dated Jun. 24, 2021.
PCT/IB/373, "International Preliminary Report on Patentability for International Application No. PCT/JP2019/019250," dated Jun. 8, 2021.
PCT/ISA/237, "Written Opinion of the International Searching Authority for International Application No. PCT/JP2019/019250," Jul. 23, 2019.
PCT/ISA/210, "International Search Report for International Application No. PCT/JP2019/019250," dated Jul. 23, 2019.
Japan Patent Office, "Notice of Allowance for Japanese Patent Application No. 2018-231252," dated Jan. 29, 2019.
European Patent Office, "Extended European Search Report and Search Opinion for European Patent Application No. 19896996.6," dated Dec. 3, 2021.

* cited by examiner

FASTENING DEVICE

RELATED APPLICATIONS

The present application is National Phase of International Application No. PCT/JP2019/019250 filed May 15, 2019, and claims priority from Japanese Application No. 2018-231252, filed Dec. 11, 2018, the disclosure of which is hereby incorporated by reference herein in its entirety.

TECHNICAL FIELD

The present invention relates to a fastening device that fastens a bolt to a fastening target object.

BACKGROUND ART

A bolt/nut fastener is used to assemble and fix a large number of mechanical structures including an automobile as a representative example. Patent Literature 1 discloses a bolt having a male screw section formed around the outer circumferential surface of the bolt head section.

CITATION LIST

Patent Literature

Patent Literature 1: Japanese Patent No. 6,381,840

SUMMARY OF INVENTION

Technical Problem

An object of the present invention is to automate bolt fastening operation.

Solution to Problem

To achieve the object described above, the invention of the present application relates, as a viewpoint, to (1) a fastening device for fastening a bolt to a fastening target object, the bolt so configured that a bolt head section male screw section is formed around a side surface of a bolt head section and an engagement receiving section is formed at a top surface of the bolt head section, the fastening device including a tension rod including a rod female screw section that engages with the bolt head section male screw section, a bit that is so disposed inside the tension rod as to be movable in an upward/downward direction, includes an engagement section that engages with the engagement receiving section, and rotates the bolt around an axis extending in the upward/downward direction with the engagement receiving section engaging with the engagement section, a supporter that is disposed in a position where the supporter circumferentially surrounds the tension rod and has a lower end section protruding downward beyond a lower end section of the tension rod, a sensor for sensing compression force acting on the supporter in the upward/downward direction, a first motor for rotating the bit around the axis, and a second motor for rotating the tension rod around the axis.

(2) The fastening device described in item (1) above, in which a bolt shaft male screw section is formed around a shaft section of the bolt, and the rod female screw section and the bolt shaft male screw section have the same screw pitch.

(3) The fastening device described in item (1) or (2) above, in which a tubular holder is disposed inside the tension rod, and a magnet, the bit attracted by the magnet, and a spring that urges the magnet downward are disposed in the holder.

(4) The fastening device described in any one of (1) to (3) above, in which the engagement receiving section is an insertion hole, and the engagement section is a lower end section of the bit inserted into the insertion hole.

(5) The invention of the present application relates, as another viewpoint, to a fastening device for fastening a bolt to a fastening target object, the bolt so configured that a bolt head section female screw section is formed in an inner circumferential surface of a recess provided in an upper surface of a bolt head section, the fastening device including a tension rod including a rod male screw section that engages with the bolt head section female screw section, a drive socket that is disposed in a position where the drive socket circumferentially surrounds the tension rod and has a lower end section including a grasper for laterally grasping the bolt head section, a supporter that is disposed in a position where the supporter circumferentially surrounds the drive socket and has a lower end section protruding downward beyond a lower end section of the drive socket, a sensor for sensing compression force acting on the supporter in the upward/downward direction, a first motor for rotating the tension rod around an axis extending in the upward/downward direction, and a second motor for rotating the drive socket around the axis.

(6) The fastening device described in (5) above, in which a bolt shaft male screw section is formed around a shaft section of the bolt, and the rod male screw section and the bolt shaft male screw section have the same screw pitch.

(7) The fastening device described in (5) or (6) above, in which a projection is formed at a lower end section of the tension rod, and the rod male screw section is formed around an outer circumferential surface of the projection.

Advantageous Effects of Invention

The configuration of above-mentioned item (1) of the present invention allows automated tightening of a bolt so configured that a male screw section is formed around the outer circumferential surface of a bolt head section. The configuration of above-mentioned item (5) of the present invention allows automated tightening of a bolt so configured that a bolt head section female screw section is formed in the inner circumferential surface of a recess in the top surface of a bolt head section.

BRIEF DESCRIPTION OF DRAWINGS

FIG. 4(*a*) is a perspective view of a bolt (variation).

FIG. 4(*b*) is a cross-sectional view of a fastening target object and a bolt (variation).

DESCRIPTION OF EMBODIMENTS

Figure 1:
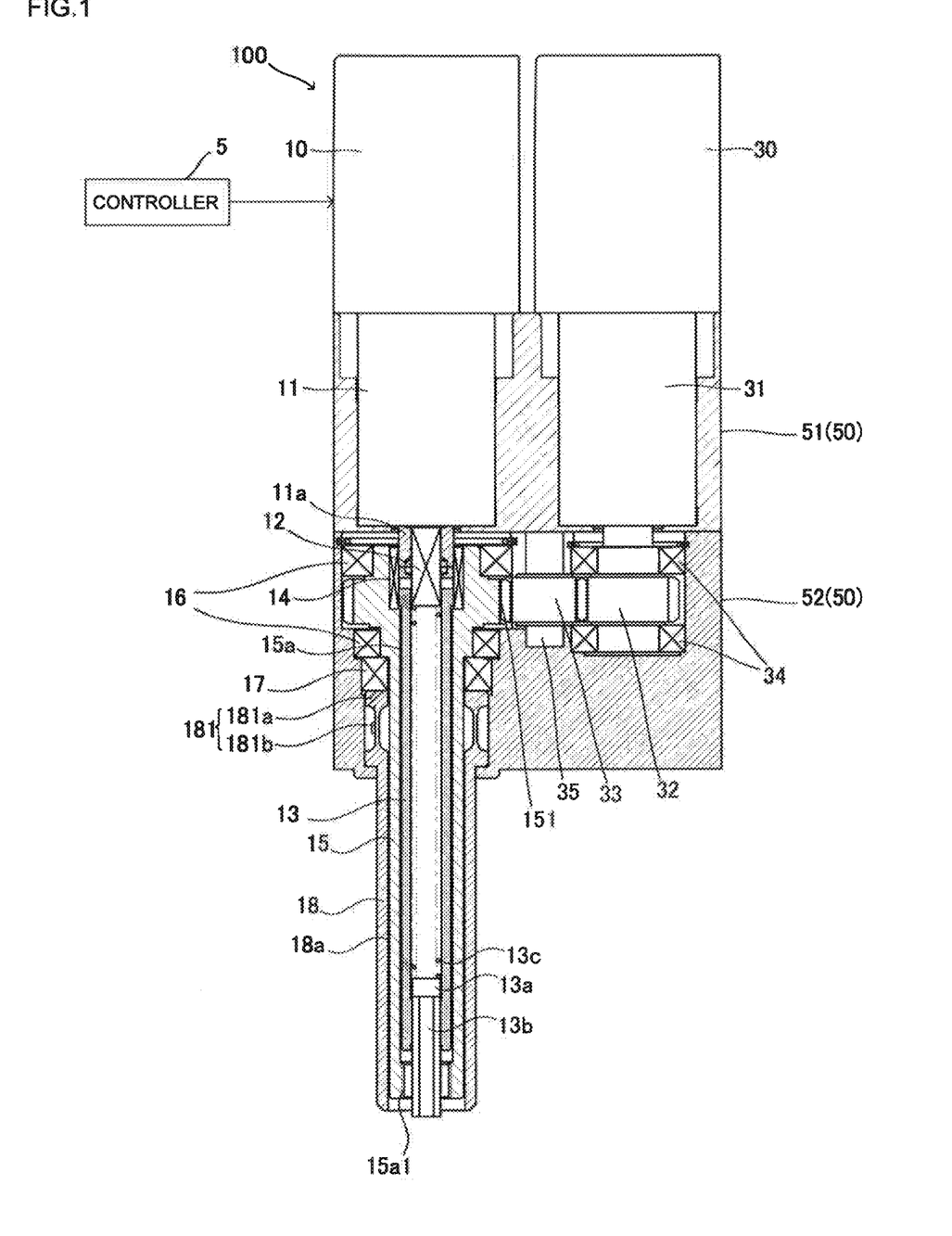
FIG. 1 is a cross-sectional view of a fastening device (first embodiment).

FIG. 1 is a cross-sectional view showing a fastening device 100. The fastening device 100 includes a first motor 10, a second motor 30, and an enclosure 50. The first motor 10 and the second motor 30 are independent of each other and driven and controlled by a controller 5. That is, the controller 5 can control the first motor 10 and the second motor 30 independently of each other. The controller 5 can, for example, be a CPU (central processing unit).

The enclosure 50 includes a body 51 and a base 52, which has a recessed upper end fixed to the lower surface of the body 51. The body 51 accommodates a first decelerator 11 and a second decelerator 31. The first decelerator 11 includes an output shaft 11a. The output shaft 11a has a tubular shape, and a power transmitter 12 is inserted into and fixed to a tubular section of the output shaft 11a. The power transmitter 12 rotates along with the output shaft 11a. A lower end section of the power transmitter 12 protrudes downward beyond the output shaft 11a, and the protruding section extends toward the interior of a tubular bit holder 13, which extends in the upward/downward direction, and is fixed. The rotational output produced by the output shaft 11a is therefore transmitted to the bit holder 13 via the power transmitter 12 to allow rotation of the output shaft 11a and the bit holder 13 integrated with each other.

The output shaft 11a and the bit holder 13 are disposed in a roughly coaxial manner and so supported as to be rotatable relative to a bearing 14. A magnet 13a is provided in the bit holder 13 and attracts a bit 13b for rotating a bolt. The bit 13b extends downward and extends beyond the lower end section of the bit holder 13. In the configuration described above, rotating the bit holder 13 allows the bit 13b to rotate around an axis extending in the upward/downward direction.

The magnet 13a and the bit 13b are so accommodated in the tubular bit holder 13 as to be slidably movable in the upward/downward direction, and a spring 13c is interposed between the magnet 13a and the power transmitter 12. The spring 13c is disposed along the inner wall of the bit holder 13. When the magnet 13a slides in the direction in which the magnet 13a approaches the power transmitter 12, the spring 13c is loaded in the compressed direction. The configuration described above allows the bit 13b to move in the upward/downward direction in such a way that the bit 13b follows a bolt 70, which will be described later.

The bit 13b wears due to a load exerted thereon when the bolt rotates. The configuration in which the bit 13b is attracted and fixed to the magnet 13a as in the present embodiment allows the bit 13b to be readily exchanged when the bit 13b has worn.

The rotational force produced by the second motor 30 is transmitted to a tension rod 15 via the second decelerator 31, a pinion gear 32, and an idle gear 33. That is, a drive gear 151, which is formed around the outer circumferential surface of the tension rod 15, engage with the idle gear 33, and the second motor 30 can be operated to rotate the tension rod 15 around an axis extending in the upward/downward direction.

Bearings 34 are disposed to receive loads acting on the pinion gear 32 and the idle gear 33 when the shaft of the second motor 30 rotates. The idle gear 33 is rotationally driven around an idle shaft 35 extending in the upward/downward direction.

The tension rod 15 includes a tension accommodator 15a for accommodating the bit holder 13 and the bearing 14. A gap that allows rotation of the tension rod 15 is formed between the bit holder 13 and the tension rod 15. The tension rod 15 is rotatably supported by bearings 16 and a thrust bearing 17.

A tension rod female screw section 15a1 is formed in the inner radial surface of a lower end section of the tension rod 15. The tension rod female screw section 15a1 engages with a bolt male screw section formed around the bolt head section when the bolt is pulled. The engagement will be described later in detail.

A supporter 18 includes a supporter accommodator 18a for accommodating the tension rod 15. The upper end section of the supporter 18 is in contact with the thrust bearing 17, and the lower end section of the supporter 18 extends downward beyond the lower end section of the tension rod 15. Therefore, when the entire fastening device 100 lowers toward a fastening target object H, the lower end section of the supporter 18 comes into contact with the fastening target object H. A gap that allows rotation of the tension rod 15 is formed between the tension rod 15 and the supporter 18.

A sensor 181 is provided on the side facing the upper end of the supporter 18. The sensor 181 includes a straining element 181a and a strain gauge 181b. The straining element 181a has a cylindrical shape having a reduced-diameter intermediate section. The strain gauge 181b is attached to the intermediate section of the straining element 181a.

In the process of pulling the bolt, the straining element 181a receives upward force having the same magnitude as that of tensile force transmitted from the supporter 18 and is therefore distorted in the compression direction within an elastic deformation range of the straining element 181a. The strain gauge 181b changes in terms of resistance in accordance with the strain of the straining element 181a and changes output voltage to be outputted to the controller 5. The controller 5 calculates the tensile force acting on the screw section of the bolt based on the amount of change in the output voltage from the strain gauge 181b. The sensor 181 is not limited to the combination of the straining element 181a and the strain gauge 181b and can be another sensor capable of detecting the tensile force acting on the bolt.

Figure 2:
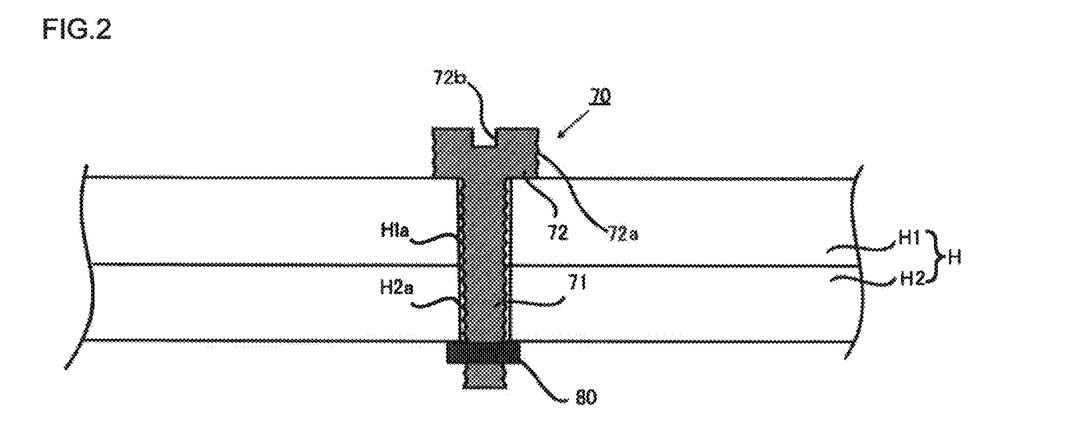
FIG. 2 is a cross-sectional view of a fastening target object and a bolt (first embodiment).
Figure 3:
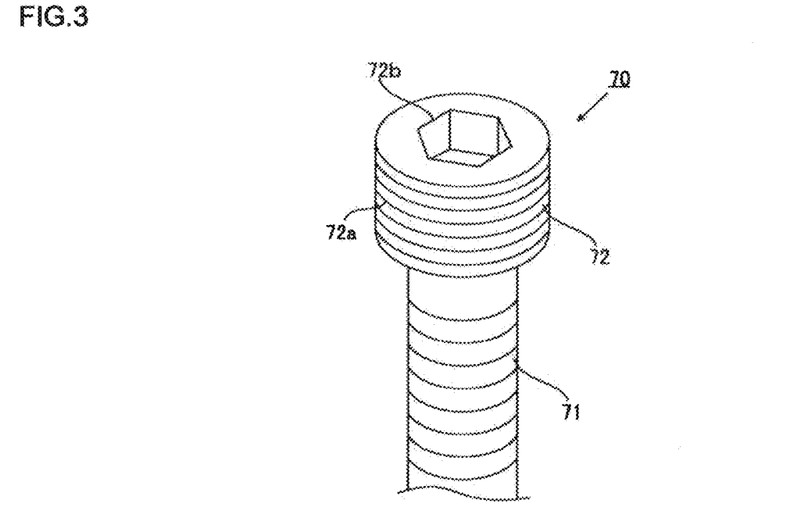
FIG. 3 is a perspective view of the bolt (first embodiment).

The bolt to be tightened by the fastening device 100 according to the present embodiment will next be described with reference to FIGS. 2 and 3. FIG. 2 is a cross-sectional view of the bolt and the fastening target object, and FIG. 3 is a perspective view of the bolt. The bolt 70 is a bolt with a hexagonal hole and is formed of a bolt shaft section 71 and a bolt head section 72. The bolt shaft section 71 has a male screw formed therearound. The fastening target object H (in other words, workpiece) is formed of fastening target objects H1 and H2, which are layered on each other in the upward/downward direction, and bolt holes H1a and H2a are formed in the fastening target objects H1 and H2, respectively.

The bolt 70 is inserted into the bolt holes H1a and H2a, and a nut 80 is caused to engage with the bolt shaft section 71 protruding downward beyond the end surface of the fastening target object H (H2). The bolt 70 is thus fastened to the fastening target object H. It is, however, noted that the invention of the present application is applicable to a fastener formed only of the bolt 70 with no nut 80. In this case, forming a female screw section that engages with the male screw section of the bolt shaft section 71 in the circumferential surface of the bolt hole H2a allows the bolt 70 to be fastened to the fastening target object H.

An insertion hole 72b having a hexagonal shape (corresponding to engagement receiving section) is formed in the top surface of the bolt head section 72. A lower end section (corresponding to engagement section) of the bit 13b can be inserted into the insertion hole 72b and rotated to fasten the bolt 70 to the fastening target object H. A bolt head section male screw section 72a is continuously formed around the side surface of the bolt head section 72 in the circumferential direction with no interruptions. Rotating the tension rod 15 allows the bolt 70 to be pulled with the tension rod female screw section 15a1 engaging with the bolt head section male screw section 72a.

Now, let S1 be the area over which the supporter 18 and the fastening target object H are in contact with each other and S2 be the area over which the bolt head section 72 and the fastening target object H are in contact with each other, and it is desirable that the contact areas S1 and S2 are equal to each other. The seat surface of the bolt head section 72 and the supporter 18 exert surface pressure on the fastening target object H. Therefore, when the contact areas S1 and S2 differ from each other (that is, when difference in surface pressure is present), the amount of deformation of the fastening target object H undesirably differs from the amount of deformation in actual bolt fastening. Further, when the difference in surface pressure excessively increases, the supporter 18 is likely to deform and damage the fastening target object H, and the difference in the amount of deformation is likely to lower the fastening precision.

Figure 4A:
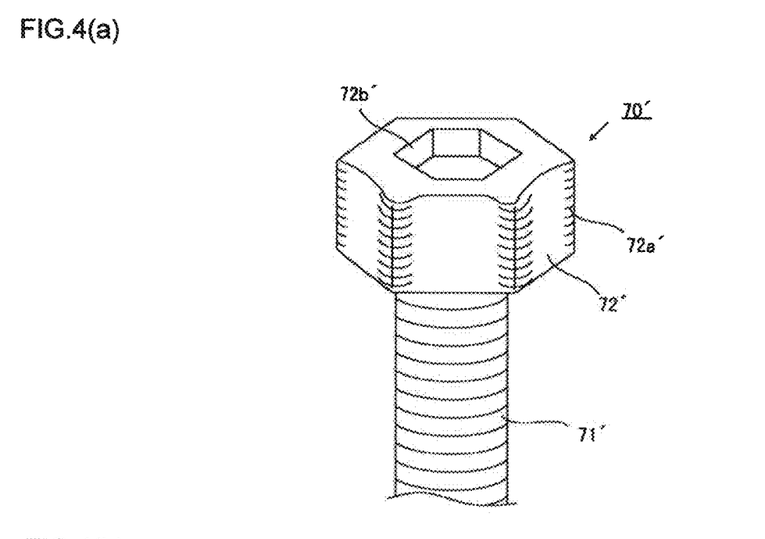

In the present embodiment, the insertion hole 72b has a hexagonal shape, but not necessarily in the present invention, and the insertion hole 72b may have an octagonal or any other polygonal shape. The invention of the present application is also applicable to a hexagonal bolt having a hexagonal bolt head section. In this case, an insertion hole 72b' may be formed in the top surface of a bolt head section 72', and bolt head section male screw sections 72a' may be intermittently formed at curved sections of the side surface of the bolt head section 72', as shown in FIG. 4(a). Further, the bolt head section male screw section 72a (72a') is not necessarily formed across the bolt head section 72 (72') from the upper end to the lower end thereof and may instead be formed only part of the section from the upper end to the lower end as long as an engagement length necessary for the rotation of the tension rod 15 can be ensured.

Figure 4B:
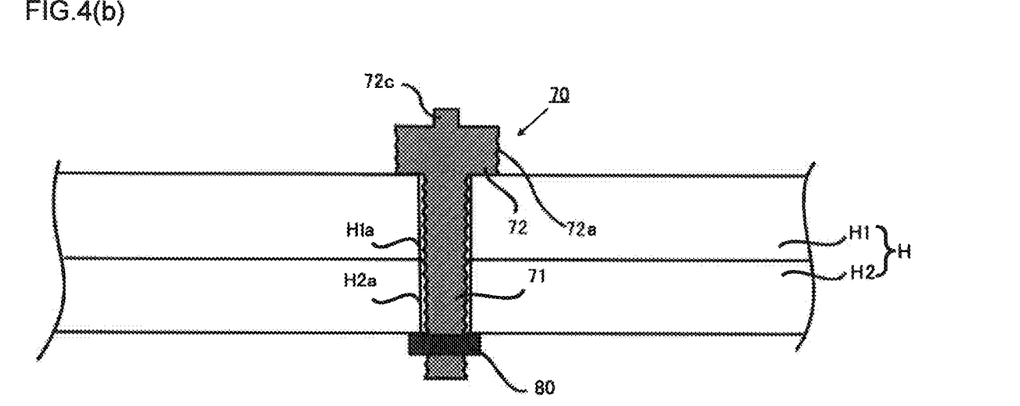

In the present embodiment, the bit 13b is inserted into the insertion hole 72b formed in the bolt head section 72 to rotate the bolt 70, but not necessarily in the present invention. Instead, a protrusion 72c (corresponding to engagement receiving section) may be formed at the bolt head section 72 (72'), and the protrusion 72c may be inserted into a recess (corresponding to engagement section) that is not shown but formed in the lower end section of the bit 13b to rotate the bolt 70, as shown in FIG. 4(b). That is, the invention of the present application is widely applicable to bolts each having a bolt head section male screw section formed around the side surface of the bolt head section and an engagement receiving section for engagement with the engagement section of the bit formed at the bolt head section. The invention of the present application is further applicable to a flanged bolt having a flange formed around the bolt head section.

The action of the fastening device 100 will next be described with reference to FIGS. 5 and 6, which are descriptive diagrams of the action. It is now assumed that the bolt 70 is temporarily attached to the fastening target object H, and that the bolt head section 72 is located in a temporal attachment position separate from the upper surface of the fastening target object H in an initial state (see FIG. 5(a)). It is further assumed that the bit 13b is inserted into the insertion hole 72b of the bolt head section 72. It is assumed that the control described below is performed by the controller 5 unless otherwise stated.

When the first motor 10 is operated, the first decelerator 11, the output shaft 11a, the power transmitter 12, and the bit holder 13 rotate, and the bit 13b held by the bit holder 13 rotates in the direction indicated with the arrow K1. When the bit 13b rotates, the bolt 70 screws downward. The fastening device 100 is so supported as to be allowed to lower by its own weight relative to a support section (not shown), and the entire fastening device 100 therefore lowers with the bit 13b rotating. As a result, the tension rod female screw section 15a1 and the bolt head section male screw section 72a become engageable with each other (see FIG. 5(b)).

Figure 5:
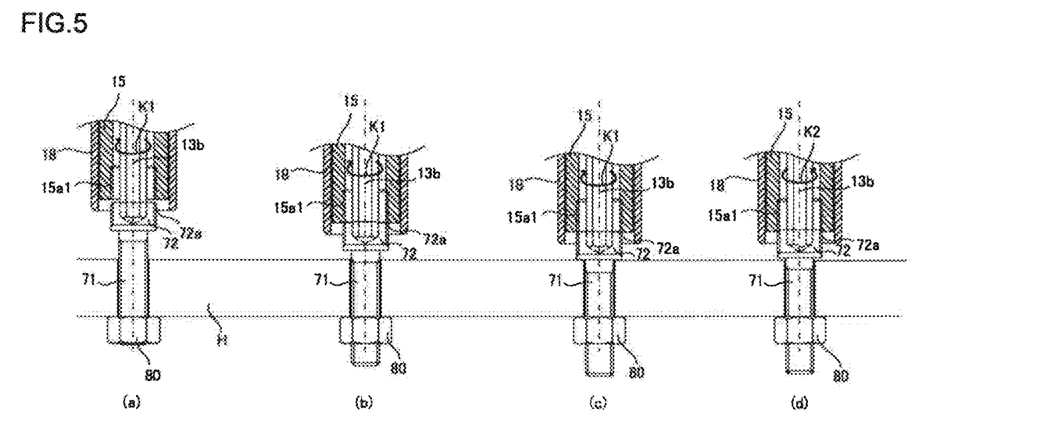
FIG. 5 describes the action (first half) of the fastening device according to the first embodiment.

When the bolt 70 further rotates and the bolt head section 72 is seated on the upper surface of the fastening target object H, the force that is received by the first motor 10 and attempts to rotate the shaft of the first motor 10 abruptly increases, resulting in an abrupt increase in feedback torque (see FIG. 5(c)). The controller 5 senses based on the feedback torque produced by the first motor 10 that the bolt 70 has been seated and stops the operation of the first motor 10. The shaft of the first motor 10 is then reversely rotated in the direction indicated by the arrow K2 to move the bolt head section 72 back to the position slightly separate from the upper surface of the fastening target object H (see FIG. 5(d)).

Thereafter, the operation of the first motor 10 is stopped, and the second motor 30 is operated. When the second motor 30 is operated, the entire fastening device 100 moves downward with the tension rod 15 rotating in the direction indicated by the arrow K1, so that the tension rod female screw section 15a1 and the bolt head section male screw section 72a engage with each other (see FIG. 6(e)). In this process, the bit 13b slides upward in the interior of the bit holder 13 while resisting the elastic force provided by the spring 13c.

When the tension rod 15 is further caused to screw downward while rotating, the lower end section of the supporter 18 comes into contact with the upper surface of the fastening target object H, so that the fastening device 100 stops lowering. Since the supporter 18 is in contact with the fastening target object H, an attempt to further rotate the tension rod 15 in the direction indicated with the arrow K1 cannot cause the tension rod 15 to screw downward. In this process, since the bit 13b inserted into the insertion hole 72b of the bolt head section 72 prevents the bolt 70 from rotating, the tension rod 15 exerts a load in the pulling direction (that is, upward) on the bolt 70. However, since the supporter 18 is in contact with the fastening target object H, rotation of the tension rod 15 cannot move the bolt 70 in the pulling direction. As a result, tensile force P acts on the nut 80 and the supporter 18 (see FIG. 6(f)). Since the upper end section of the supporter 18 is in contact with the thrust bearing 17, the thrust bearing 17 and the fastening target object H compress the supporter 18, and the compression force is detected as tensile force P with the sensor 181.

A target value of the tensile force P is now defined as target tensile force (10 kN, for example). To prevent overshooting operation of the second motor 30, it is desirable to decelerate the rotation of the shaft of the second motor 30 as the tensile force P approaches the target tensile force and stop the operation of the second motor 30 when the tensile force P reaches the target tensile force (corresponding to second step). The target tensile force is also target axial force acting on the bolt 70.

The shaft of the first motor 10 is then caused to rotate again in the direction indicated with the arrow K1 with the tensile force P applied to cause the bolt head section 72 to be seated on the fastening target object H (corresponding to third step). It is desirable that the tension rod female screw section 15a1 and the male screw formed around the bolt shaft section 71 have the same screw pitch. If the screw pitches differ from each other, the rotation control performed on the bit 13b (that is, drive control performed on first motor 10) and the rotation control performed on the tension rod 15 (that is, drive control performed on second motor 30) need to be performed simultaneously, resulting in cumbersome control. On the other hand, when the screw pitches are equal to each other, the bolt is tightened only by rotation of the bit 13b, resulting in no cumbersome synchronous control.

Figure 6:
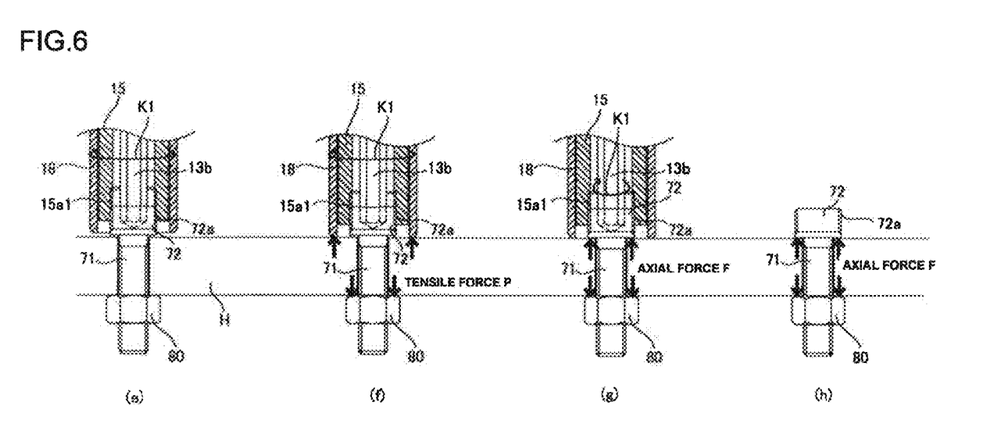
FIG. 6 describes the action (second half) of the fastening device according to the first embodiment.
Figure 7:
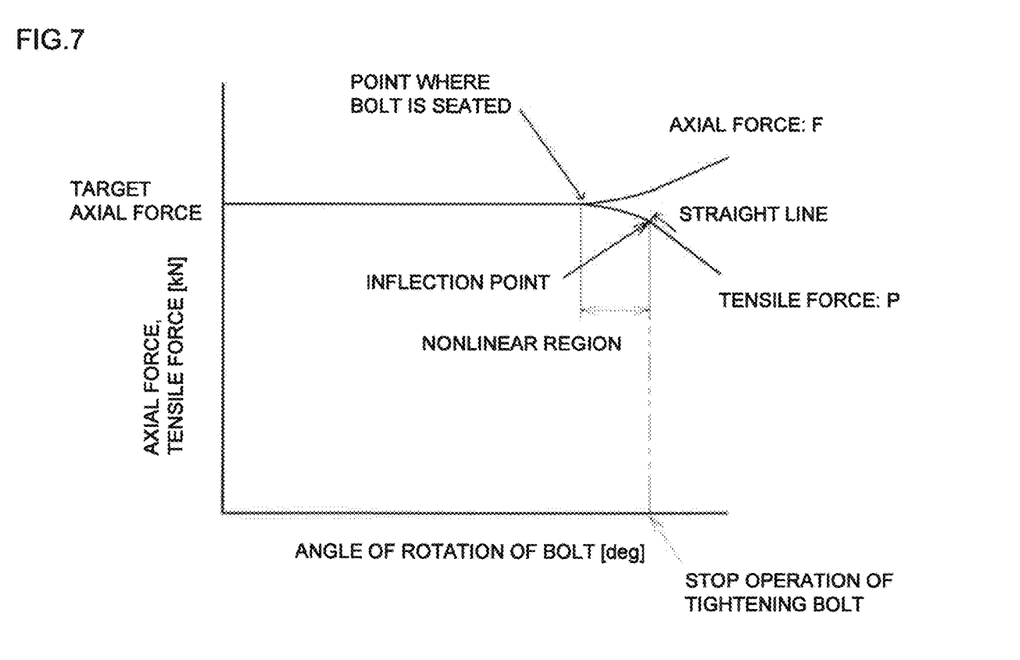
FIG. 7 shows graphs illustrating the relationship among the angle of rotation of the bolt, axial force acting on the bolt, and tensile force acting on the bolt.

When the bolt head section 72 comes into contact with the fastening target object H, the tensile force P starts decreasing, whereas axial force F acting on the bolt 70 increases (see FIGS. 6(g) and 7). The derivative of the tensile force P, dP/dθ, is regularly monitored, and the rotation of the bit 13b is stopped when the behavior of dP/dθ changes from an unstable curve (nonlinear region) to a straight line (corresponding to fourth step). The term "dθ" corresponds to the angle of rotation of the bolt 70.

Finally, the shaft of the second motor 30 is rotated in the direction opposite the direction at the time of bolt tightening to retract the fastening device 100 from the fastening target object H and cause the bolt head section 72 and the tension rod 15 to disengage from each other (see FIG. 6(h)). At this point, the axial force F acting on the bolt 70 shows a value close to the target tensile force, whereby precise axial force F can be provided.

In the present embodiment, the operation of tightening the bolt 70 is stopped when the axial force becomes greater than the target axial force F to cause the bolt head section 72 and the tension rod 15 to disengage from each other, as shown in FIG. 7. When the operation of tightening the bolt 70 is stopped immediately after the bolt 70 is seated on the fastening target object H to cause the bolt head section 72 and the tension rod 15 to disengage from each other, the axial force decreases by the amount corresponding to the elastic deformation of the bolt 70 and the fastening target object H. A decrease σ representing the decrease described above corresponds to the difference between the axial force produced when the behavior of dP/dθ changes from a curve to a straight line and the target axial force F. It is, however, noted that the tensile force P may be set in advance at a value greater by the decrease σ in expectation of the decrease in the axial force after the bolt 70 is seated, and the operation of tightening the bolt 70 may be stopped immediately after the bolt 70 is seated. In this case, when the bolt head section 72 and the tension rod 15 are caused to disengage from each other, the axial force acting on the bolt 70 decreases toward the target axial force F.

Second Embodiment

Figure 8:
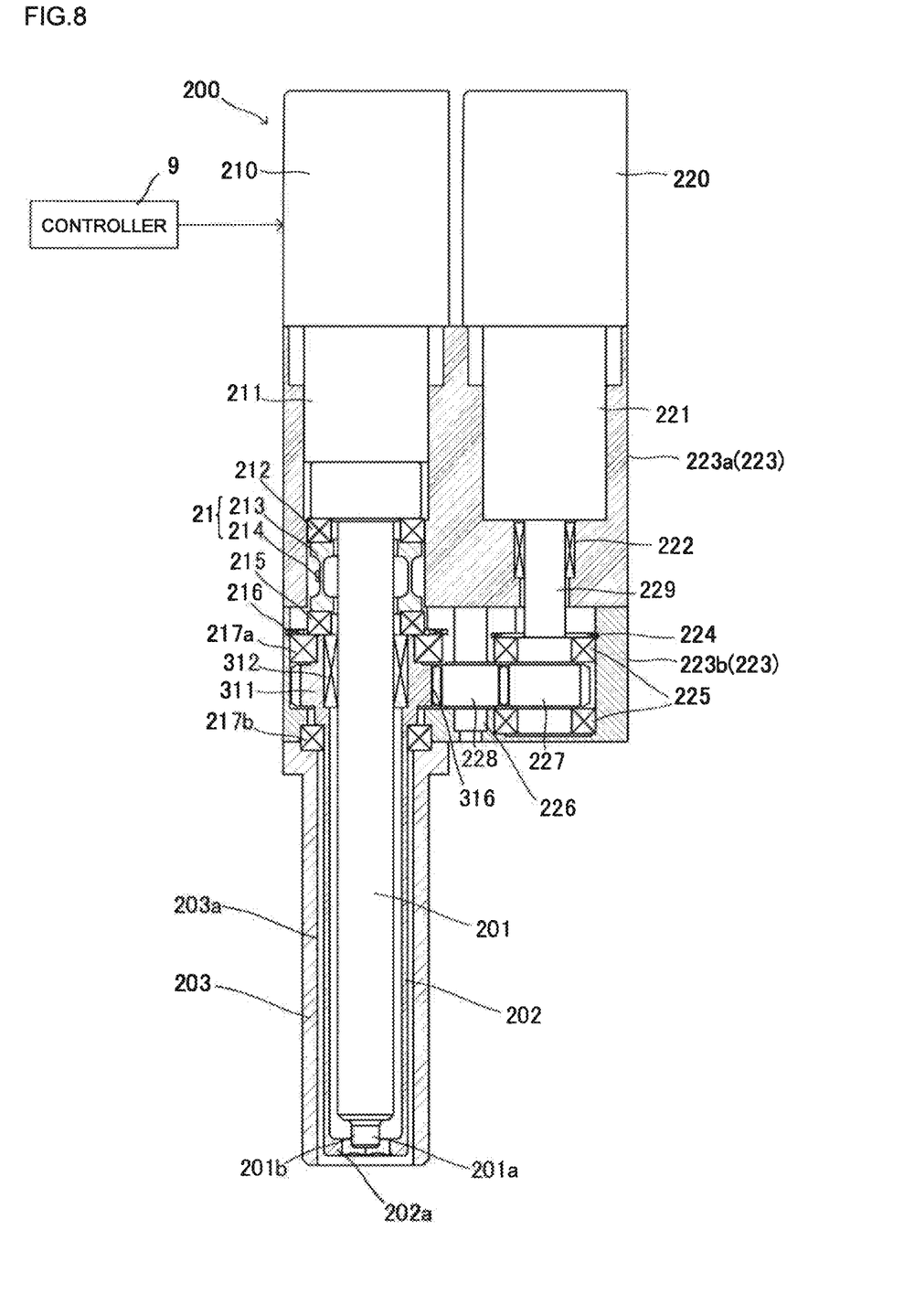
FIG. 8 is a cross-sectional view of a fastening device (second embodiment).
Figure 9:
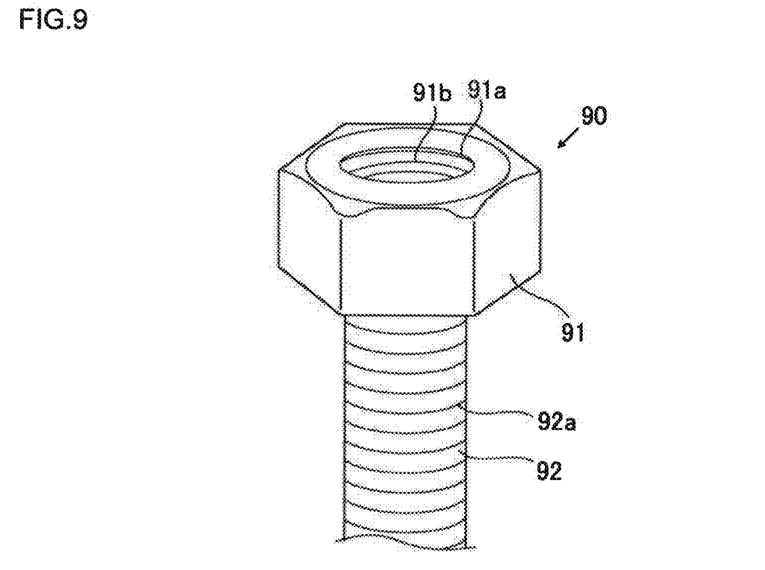
FIG. 9 is a perspective view of part of a bolt (second embodiment).

FIG. 8 is a cross-sectional view of a fastening device 200.
FIG. 9 is a perspective view of part of the bolt. A bolt 90 includes a bolt head section 91 and a bolt shaft section 92. A bottomed, tubular head section opening 91a (corresponding to recess) is formed in the top surface of the bolt head section 91, and a head section female screw section 91b is formed in the inner circumferential surface of the head section opening 91a. A male screw 92a is formed around the bolt shaft section 92. The bolt 90 is fastened along with a nut 93 (see FIGS. 10 and 11), which will be described later, to the fastening target object H. The fastening target object H is the same as that in the first embodiment and will therefore not be described.

The fastening device 200 includes a first motor 210, a second motor 220, and an enclosure 223. The first motor 210 and the second motor 220 are independent of each other and driven and controlled by a controller 9. That is, the controller 9 can control the first motor 210 and the second motor 220 independently of each other. The controller 9 can, for example, be a CPU (central processing unit).

The enclosure 223 includes a body 223a and a base 223b, which has a recessed upper end fixed to the lower surface of the body 223a. The body 223a accommodates a first decelerator 211 and a second decelerator 221. A tension rod 201 for rotating the bolt 90 protrudes beyond the lower surface of the enclosure 223. A columnar protrusion 201a having a columnar shape (corresponding to projection) is provided at the lower end section of the tension rod 201, and a rod male screw section 201b are formed around the outer circumferential surface of the columnar protrusion 201a.

The rotational force produced by the first motor 210 is transmitted to the tension rod 201 via the first decelerator 211, and the tension rod 201 rotates around an axis extending in the upward/downward direction. Rotating the tension rod 201 with the rod male screw section 201b of the tension rod 201 and the head section female screw section 91b engaging with each other allows the bolt 90 to be tightened. The fastening device 200 is so supported as to be allowed to lower by its own weight relative to a support section (not shown). Therefore, when the bolt 90 screws toward the fastening target object H, the entire fastening device 200 lowers along with the bolt 90.

The second motor 220 is located next to the first motor 210 in a side-by-side fashion and connected to a second decelerator 221 located immediately below the second motor 220. The second decelerator 221 decelerates the rotation inputted from the second motor 220 and outputs the decelerated rotation via an output shaft 229. The output shaft 229 is so supported as to be rotatable relative to a bearing 222.

The rotational force produced by the second motor 220 is transmitted to a drive socket 202 via the second decelerator 221, the output shaft 229, a pinion gear 227, and an idle gear 228. That is, a drive gear 316, which is formed around the outer circumferential surface of the drive socket 202, engage with the idle gear 228, and the second motor 220 can be operated to rotate the drive socket 202 around an axis extending in the upward/downward direction.

Bearings 225 are disposed to receive loads acting on the pinion gear 227 and the idle gear 228 when the shaft of the second motor 220 rotates. The idle gear 228 is rotationally driven via an idle shaft 226 extending in the upward/downward direction.

The drive socket 202 protrudes beyond the lower surface of the enclosure 223. The drive socket 202 is so supported as to be rotatable relative to a pair of upper and lower bearings 217a, 217b and a bearing 312. A retaining ring 216 is provided to prevent the upper bearing 217a from falling off.

The drive socket 202 has a tubular shape and accommodates the tension rod 201. A bolt head section grasper 202a, which protrudes inward in the radial direction, is formed at a lower end section of the drive socket 202. The inner radial surface of the bolt head section grasper 202a has a shape corresponding to the side surface of the bolt head section 91 (that is, hexagonal shape in the present embodiment). Rotating the drive socket 202 with the bolt head section grasper 202a fit to the bolt head section 91 allows the bolt 90 to screw relative to the fastening target object H. An attempt to rotate the bolt 90 via the tension rod 201 with the drive socket 202 being stationary cannot rotate the bolt 90 because the bolt head section grasper 202a grasps the bolt head section 91.

A supporter 203 includes a supporter accommodator 203a for accommodating the drive socket 202. The upper end section of the supporter 203 is in contact with the bearing 217b, and the lower end section of the supporter 203 extends downward beyond the lower end section of the drive socket 202. Therefore, when the entire fastening device 200 lowers toward the fastening target object H, the lower end section of the supporter 203 comes into contact with the fastening target object H. A gap that allows the rotation of the drive socket 202 is formed between the drive socket 202 and the supporter 203.

Now, let S1 be the area over which the supporter 203 and the fastening target object H are in contact with each other and S2 be the area over which the bolt head section 91 and the fastening target object H are in contact with each other, and it is desirable that the contact areas S1 and S2 are equal to each other. The seat surface of the bolt head section 91 and the supporter 203 exert surface pressure on the fastening target object H. Therefore, when the contact areas S1 and S2 differ from each other (that is, when difference in surface pressure is present), the amount of deformation of the fastening target object H undesirably differs from the amount of deformation in actual bolt fastening. Further, when the difference in surface pressure excessively increases, the supporter 203 is likely to deform and damage the fastening target object H, and the difference in the amount of deformation is likely to lower the fastening precision.

A sensor 21 includes a straining element 213 and a strain gauge 214. The straining element 213 has a cylindrical shape having a reduced-diameter intermediate section. The straining element 213 can be made of metal. The straining element 213 is disposed radially outside the tension rod 201 and between the decelerator 211 and the drive socket 202. The upper portion of the straining element 213 is pressed by the decelerator 211 via a thrust bearing 212. A lower portion of the straining element 213 is supported by the drive socket 202 via a thrust bearing 215. The strain gauge 214 is attached to the intermediate section of the straining element 213. The sensor 21 may instead be provided in the supporter 203.

In the process of pulling the bolt 90, the straining element 213 receives upward force having the same magnitude as that of tensile force transmitted from the supporter 203 and is therefore distorted in the compression direction within an elastic deformation range of the straining element 213. The strain gauge 214 changes in terms of resistance in accordance with the strain of the straining element 213 and changes output voltage to be outputted to the controller 9. The controller 9 calculates the tensile force acting on the screw section of the bolt 90 based on the amount of change in the output voltage from the strain gauge 214. Thrust bearings 212 and 215, which are provided on the upper and lower sides of the sensor 21, have the function of suppressing transmission of turbulent force received from an object other than the supporter 203 to the sensor 21. The sensor 21 is not limited to the combination of the straining element 213 and the strain gauge 214 and can be another sensor capable of detecting the tensile force acting on the bolt 90.

The action of the fastening device 200 will next be described with reference to FIGS. 10 and 11, which are descriptive diagrams of the action. It is now assumed that the bolt 90 is temporarily attached to the fastening target object H, and that the bolt head section 91 is located in a temporal attachment position separate from the upper surface of the fastening target object H in an initial state (see FIG. 10(a)). It is further assumed that the bolt head section grasper 202a of the drive socket 202 grasps an upper end section of the bolt head section 91. It is still further assumed that the columnar protrusion 201a of the tension rod 201 is in contact with the upper end of the head section female screw section 91b of the bolt head section 91. It is still further assumed that the control described below is performed by the controller 9 unless otherwise stated.

When the second motor 220 is operated, the second decelerator 221, the output shaft 229, the pinion gear 227, the idle gear 228, and the drive gear 316 rotate, and the bolt 90 grasped by the grasper 202a of the drive socket 202 rotates in the direction indicated by the arrow K1 (in other words, clockwise direction in plan view). When the drive socket 202 rotates, the bolt 90 screws downward. The fastening device 200 is so supported as to be allowed to lower by its own weight relative to a support section (not shown), and the entire fastening device 200 therefore lowers with the drive socket 202 rotating.

When the drive socket 202 further rotates the bolt 90 in the direction indicated by the arrow K1 and the bolt head section 91 is seated on the upper surface of the fastening target object H, the force that is received by the second motor 220 and attempts to rotate the shaft of the second motor 220 abruptly increases, resulting in an abrupt increase in the feedback torque. The controller 9 senses based on the feedback torque produced by the second motor 220 that the bolt 90 has been seated and stops the operation of the second motor 220. FIG. 10(b) shows the state immediately after the operation of the second motor 220 is stopped.

After the operation of the second motor 220 is stopped, the second motor 220 is so operated that the shaft thereof rotates in the opposite direction to rotate the drive socket 202 in the direction indicated with the arrow K2 (in other words, counterclockwise direction in plan view). When the drive socket 202 is rotated in the direction indicated with the arrow K2, the bolt 90 screws upward, and the tension rod 201, the drive socket 202, and the supporter 203 integrally move upward. The bolt head section 91 thus moves to a position slightly separate from the upper surface of the fastening target object H (in other words, tension rod drive start position). FIG. 10(c) shows the state immediately after the bolt 90 reaches the tension rod drive start position.

Thereafter, the operation of the second motor 220 is stopped, and the first motor 210 is operated. When the first motor 210 is operated, the tension rod 201 screws toward the bottom surface of the head section opening 91a of the bolt head section 91 while rotating in the direction indicated by the arrow K1, and the drive socket 202 and the supporter 203 lower along with the tension rod 201 toward the fastening target object H. FIG. 11(d) shows the state in a halfway position where the tension rod 201, the drive socket 202, and the supporter 203 lower toward the fastening target object H.

Figure 10:
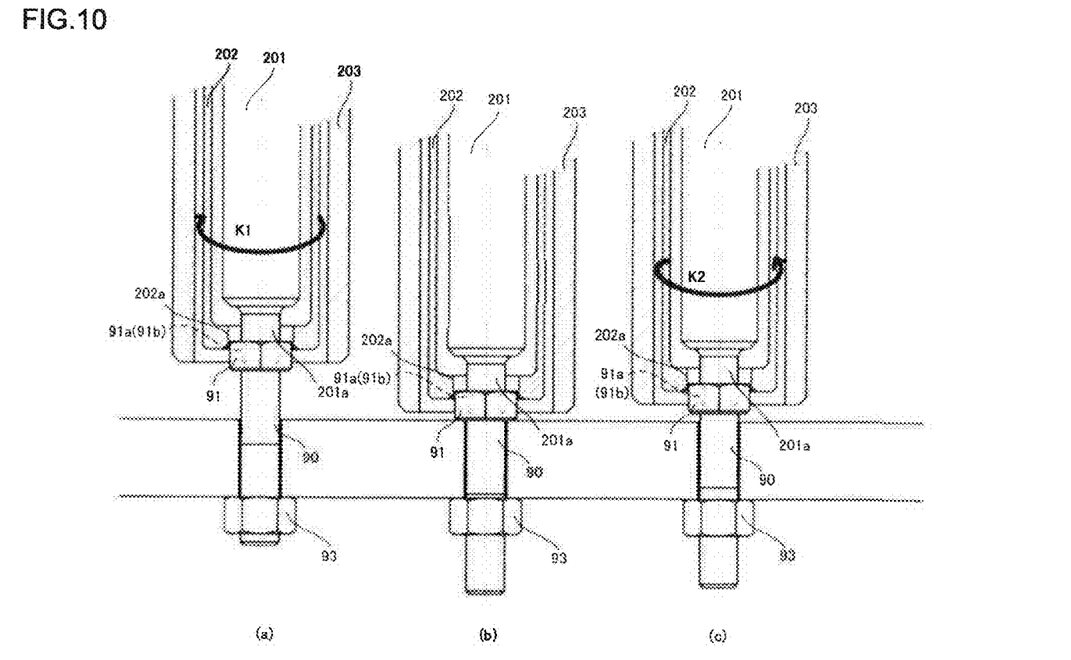
FIG. 10 describes the action (first half) of the fastening device according to the second embodiment.
Figure 11:
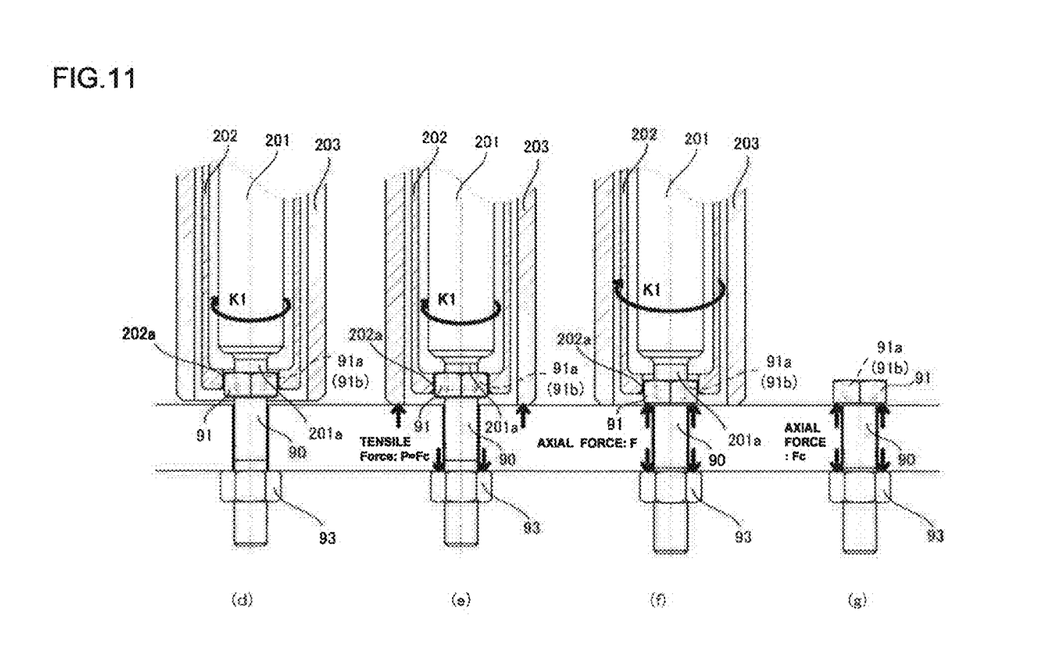
FIG. 11 describes the action (second half) of the fastening device according to the second embodiment.

The position of the bolt 90 does not change in the course of transition from the step shown in FIG. 10(c) to the step shown in FIG. 11(d).

When the tension rod 201 further screws, the lower end section of the supporter 203 comes into contact with the upper surface of the fastening target object H, so that the fastening device 200 stops lowering. FIG. 11(e) shows the state immediately after the supporter 203 comes into contact with the upper surface of the fastening target object H. Since the supporter 203 is in contact with the fastening target object H, an attempt to further rotate the tension rod 201 in the direction indicated with the arrow K1 cannot cause the tension rod 201 to screw downward.

In this process, since the grasper 202a of the drive socket 202 prevents the bolt 90 from rotating, the tension rod 201 exerts a load in the pulling direction (that is, upward) on the bolt 90. However, since the supporter 203 is in contact with the fastening target object H, rotation of the tension rod 201 cannot move the bolt 90 in the pulling direction. As a result, tensile force P acts on the nut 93 and the supporter 203 (see FIG. 11(e)). In this process, the members (such as straining element 213) sandwiched between the thrust bearing 212 and the supporter 203 are compressed, and the compression force is detected as tensile force P with the strain gauge 214.

A target value of the tensile force P is now defined as target tensile force (10 kN, for example). To prevent overshooting operation of the first motor 210, it is desirable to decelerate the rotation of the shaft of the first motor 210 as the tensile force P approaches the target tensile force and stop the operation of the first motor 210 when the tensile force P reaches the target tensile force. The target tensile force is also target axial force acting on the bolt 90.

The shaft of the second motor 220 is then caused to rotate again in the direction indicated with the arrow K1 with the tensile force P applied to cause only the bolt 90 out of the tension rod 201, the drive socket 202, the supporter 203, and the bolt 90 to screw downward. In other words, the bolt 90 moves in the direction in which the bolt 90 is pulled out of the tension rod 201. When the bolt 90 further screws downward, the bolt head section 91 is seated on the fastening target object H. It is desirable that the head section female screw section 91b and the male screw 92a of the bolt shaft section 92 have the same screw pitch. If the screw pitches differ from each other when performing from the step shown in FIG. 11(e) to the step shown in FIG. 11(f), the rotation control performed on the tension rod 201 (that is, drive control performed on first motor 210) and the rotation control performed on the drive socket 202 (that is, drive control performed on second motor 220) need to be performed simultaneously, resulting in cumbersome control. On the other hand, when the screw pitches are equal to each other, the bolt 90 is tightened only by rotation of the drive socket 202, resulting in no cumbersome control.

When the bolt head section 91 comes into contact with the fastening target object H, the tensile force P starts decreasing, whereas axial force F acting on the bolt 90 increases (see FIGS. 11(f) and 7). The derivative of the tensile force P, dP/dθ, is regularly monitored, and the rotation of the drive socket 202 is stopped when the behavior of dP/dθ changes from an unstable curve (nonlinear region) to a straight line. The term "dθ" corresponds to the angle of rotation of the bolt 90.

Finally, the shaft of the first motor 210 is rotated in the direction opposite the direction at the time of bolt tightening to retract the tension rod 201 to a position above the bolt head section 91 and cause the drive socket 202 and the bolt head section 91 to disengage from each other. The bolt 90 is thus removed from the fastening device 200. At this point, the axial force F acting on the bolt 90 shows a value close to the target tensile force, whereby precise axial force F can be provided.

Example of Other Usage of Fastening Device 100

In the embodiments described above, the fastening device 100 (200) is used to newly tighten the bolt 70 (90), but not necessarily in the present invention, and the fastening device 100 (200) may be used to retighten the existing bolt 70 (90) determined to have insufficient axial force in an axial force detection step. For example, when bolts are successively fastened to a flange-shaped multi-axis workpiece (fastening target object), the axial force acting on a bolt fastened in an early stage of the fastening process decreases in some cases. In such cases, after the fastening device 100 (200) fastens the bolt, the axial force acting on the bolt can be detected by pulling the bolt. An axial force detection theory is described in Japanese Patent No. 4,028,254 and will therefore not be described in detail. When it is determined that the axial force is insufficient as a result of the axial force detection, the fastening device 100 (200) can perform retightening to manage the axial force with higher reliability. Moreover, the fastening devices 100 (200) according to the embodiments of the present invention can be arranged (in the form of a matrix, for example) and simultaneously tighten a plurality of bolts 70 (90). For example, even in the case of a multi-axis workpiece, such as bolts for a cylinder head of an engine, the fastening devices 100 (200) can perform simultaneous tightening, whereby stable axial force is provided across the entire product, resulting in improvement in the quality of the product.

REFERENCE SIGNS LIST 5, 9: Controller
10, 210: First motor
11, 211: First decelerator
11a: Output shaft
12: Power transmitter
13: Bit holder
13a: Magnet
13b: Bit
13c: Spring
14: Bearing
15, 201: Tension rod
15a1: Tension rod female screw section
18, 203: Supporter
30, 220: Second motor
70: Bolt
71: Bolt shaft section
72: Bolt head section
72a: Bolt head section male screw section
72b: Insertion hole
100: Fastening device
200: Fastening device

The invention claimed is:

1. A fastening device for fastening a bolt to a fastening target object, the bolt being so configured that a bolt head section male screw section is formed around a side surface of a bolt head section and an engagement receiving section is formed at a top surface of the bolt head section, the fastening device comprising:
  a tension rod including a rod female screw section that engages with the bolt head section male screw section;

a bit that is so disposed inside the tension rod as to be movable in an upward/downward direction, includes an engagement section that engages with the engagement receiving section, and rotates the bolt around an axis extending in the upward/downward direction with the engagement receiving section engaging with the engagement section;

a supporter that is disposed in a position where the supporter circumferentially surrounds the tension rod and has a lower end section protruding downward beyond a lower end section of the tension rod;

a sensor for sensing compression force acting on the supporter in the upward/downward direction;

a first motor for rotating the bit around the axis;

a second motor for rotating the tension rod around the axis; and a controller for controlling the first motor and the second motor, wherein the controller controls the first and the second motors to carry out a first process, a second process and a third process such that the first process is a process of pulling the bolt via the tension rod by controlling the second motor in a state where the supporter is in contact with the fastening target object, the second process is a process of stopping the second motor when the tensile force reaches the target tensile force in the first process, and the third process is a process of rotating the bit around the axis and fastening the bolt by controlling the first motor.

2. The fastening device according to claim 1, wherein a bolt shaft male screw section is formed around a shaft section of the bolt, and the rod female screw section and the bolt shaft male screw section have the same screw pitch.

3. The fastening device according to claim 1, wherein a tubular holder is disposed inside the tension rod, and a magnet, the bit attracted by the magnet, and a spring that urges the magnet downward are disposed in the holder.

4. The fastening device according to claim 1, wherein the engagement receiving section is an insertion hole, and the engagement section is a lower end section of the bit inserted into the insertion hole.

5. The fastening device according to claim 1, wherein in tightening the bolt, the controller operates (1) the second motor to rotate the bid in a first direction, (2) the second motor to stop, (3) the first motor to rotate the tension rod in the first direction, (4) the first motor to stop based on the sensor, and (5) the second motor to rotate the bid in the first direction, and then to stop.

* * * * *